United States Patent [19]
Ohkawa

[11] 3,930,439
[45] Jan. 6, 1976

[54] DEVICE FOR WRAPPING SHEETS AROUND FOOD

[75] Inventor: Nobuyoshi Ohkawa, Amagasaki, Japan

[73] Assignee: Daieigiken, Inc., Amagasaki, Japan

[22] Filed: Mar. 12, 1974

[21] Appl. No.: 450,493

[30] Foreign Application Priority Data
Mar. 12, 1973  Japan .............................. 47-29195

[52] U.S. Cl. ............................................. 99/450.1
[51] Int. Cl.² ............................ 53 221; A21C 11/00
[58] Field of Search .......... 99/450.6, 450.1; 53/209, 53/220, 221

[56] References Cited
UNITED STATES PATENTS
2,627,822  2/1953  Hubbard ........................... 99/450.1
3,164,937  1/1965  Ingram ................................. 53/229

FOREIGN PATENTS OR APPLICATIONS
45-21620  7/1970  Japan ................................ 99/450.6

*Primary Examiner*—Harvey C. Hornsby
*Assistant Examiner*—Alan Cantor
*Attorney, Agent, or Firm*—Tab T. Thein

[57] ABSTRACT

Device for wrapping thin dough sheets around a mixture of minced vegetables and meat. The mixture is wrapped into the sheet by the reciprocal movement of a belt. One end of the belt is secured to a cradle and the other end to a slide plate. The latter is reciprocated by a cam mechanism connected to a main spindle.

3 Claims, 5 Drawing Figures

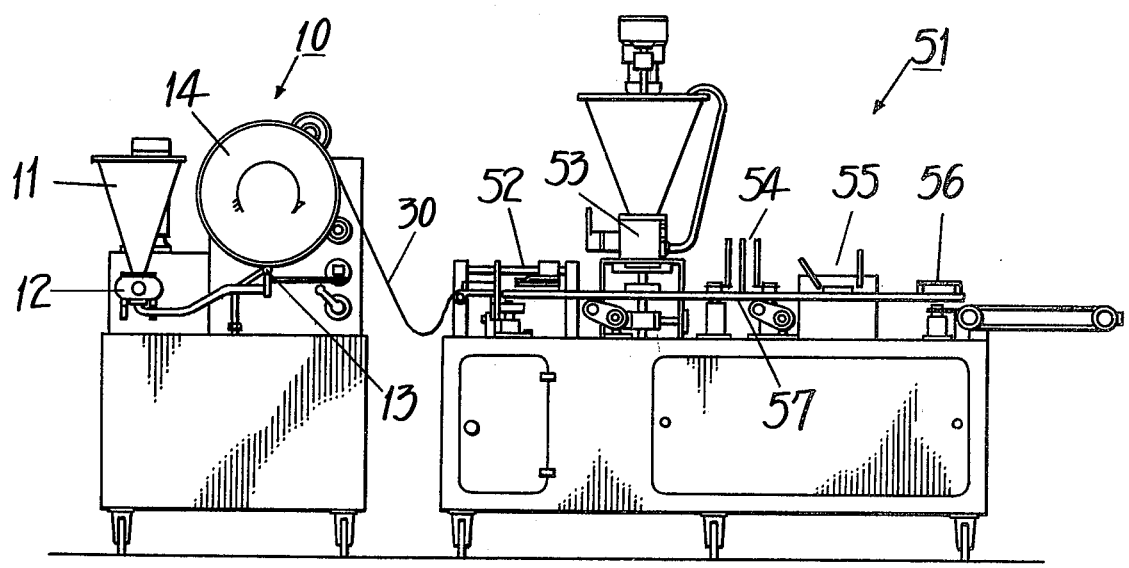

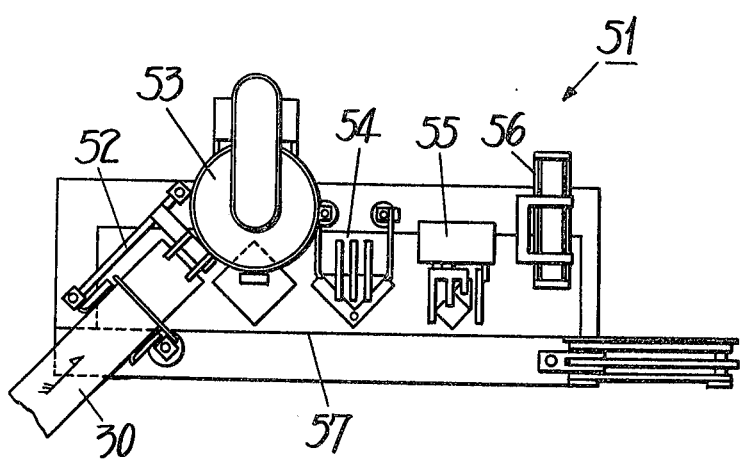

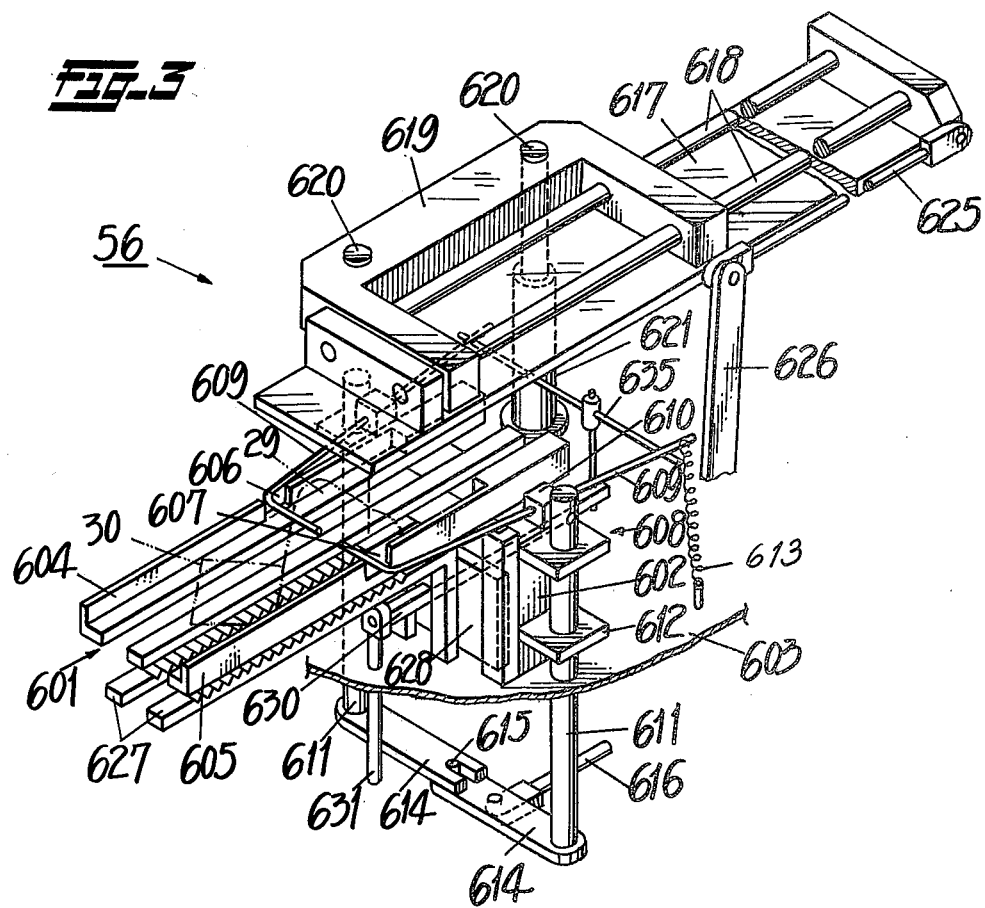

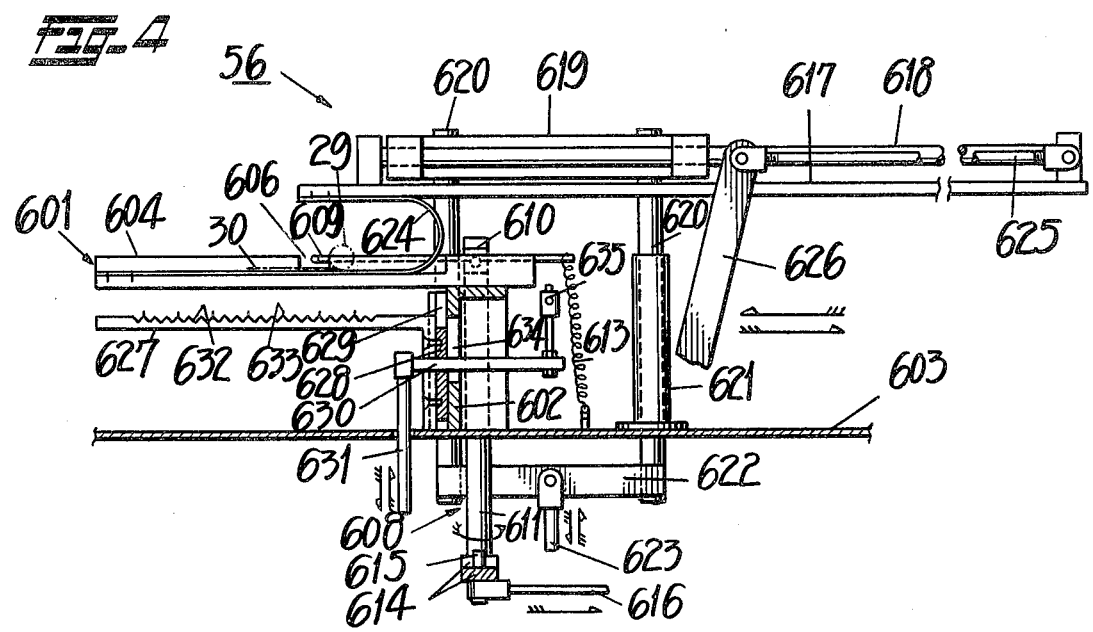

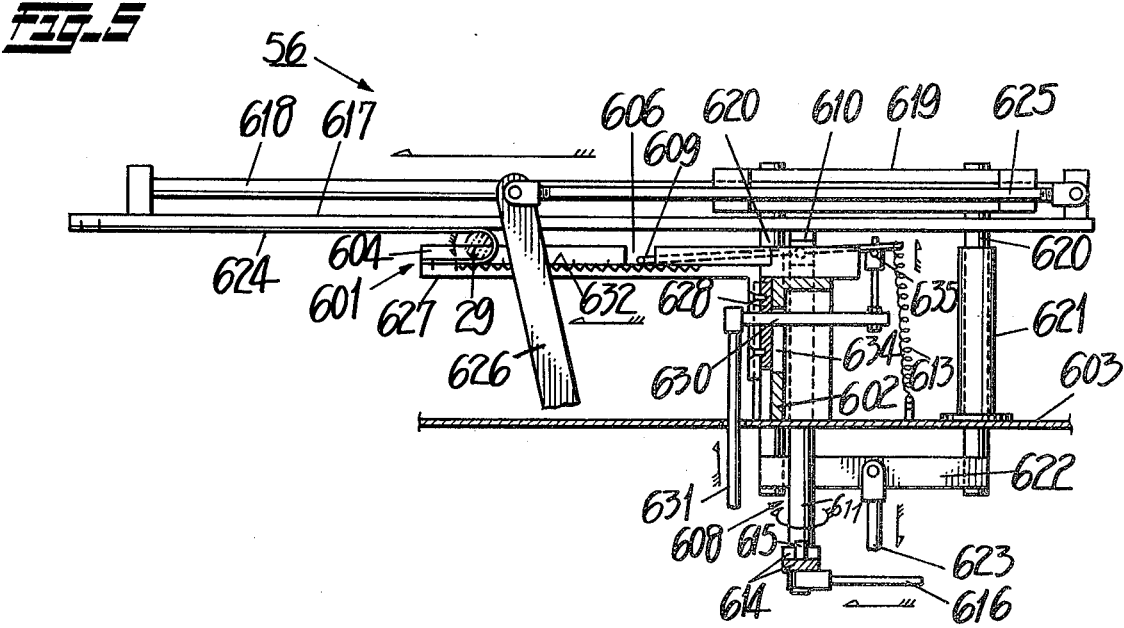

3,930,439

DEVICE FOR WRAPPING SHEETS AROUND FOOD

This invention relates to a device for wrapping a thin dough sheet around a mixture of minced vegetables and meat, and especially offers a device which wraps the sheet completely around the mixture.

In the past, the process of wrapping of thin sheets around the mixture was done by handcraft, and mass production of rolled foods was impossible because of the low productivity of the handcraft. In addition, the quality of the products varied due to the handcraft, and sanitary requirements were not always fulfilled. Today higher productivity, uniform quality and better sanitary production conditions are required.

The first object of this invention is therefore to provide a device which wraps a thin dough sheet around a mixture at high speed.

The second object of the invention is to provide a device which produces products with a uniform quality.

The third object is to provide a device which produces the products at good sanitary conditions, eliminating manual contact with the unifinished products.

The essential feature in the invention is embodied in a device which is moved reciprocally by a cam mechanism connected to a main rotating shaft to which a slide plate is connected, and one end of a belt is secured to the slide plate. This device produces rolled foods of uniform quality, sanitarily, and with high speed.

It should be added at this point that this invention is closely related to those of other applications, filed simultaneously herewith, namely one on a "Device for Wrapping Sheets around Food in Rolled Form" (incorporating devices for supplying a mixture to dough sheets, another for doubling the sheets, and one for bending them); another on a "Device for Conveying Rolled Food"; yet another on a "Device for Processing DOugh" (for forming and baking dough sheets); and finally one on a "Dough Processing Device" (preventing dough from sticking). These applications of the inventor were all filed on Mar. 12, 1974, respectively under Ser. Nos. 450,489, -90, -91 and -92.

Other objects and many of the attendant advantages of the invention will be readily appreciated as the same becomes better understood by reference to the following detailed description, when considered with the accompanying drawings, wherein FIG. 1 is an elevation of a device for producing dough sheets and baking them, together with a device for pulling a dough sheet, incorporating further devices, in relation to the inventive device for wrapping sheets around food;

FIG. 2 is a plan view of a main portion of FIG. 1 with details of the inventive device and of the pulling device with which it is shown associated;

FIG. 3 is a perspective view of the device for wrapping the sheets around food;

FIG. 4 is a vertical sectional view of the device shown in FIG. 3; and

FIG. 5 is a sectional view similar to that of FIG. 4 for explaining the operation of the inventive wrapping device.

A device 10 for producing dough sheets as shown in FIG. 1 makes thin sheets from raw materials such as eggs and dough. The raw material is supplied by the operation of a gear pump 12 from a hopper 11 through a slit nozzle 13 on an iron-plate surface of a rotating drum 14 where a continuous belt of a thin dough sheet 30 is made.

A device 51 for pulling the dough sheets includes the above-mentioned device 10, which pulls the sheets 30, a device 52 for cutting up the dough sheets, namely the continuous thin sheets into the desired size, a device 53 for supplying a mixture of food or materials to the dough sheets in a constant amount, a device 54 for doubling the dough sheets 30 along the back of the mixture supplied, a device 55 for bending the dough sheets along both sides of the mixture, a device according to the present invention, numbered 56, for wrapping the sheets around the food, namely into a cylindrical shape, and also a device 57 for conveying or transferring the sheets 30 from each of the devices 52 to 56 to the next following device at predetermined intervals.

As shown in FIG. 3, a comb-shaped cradle 601 is secured horizontally to a bracket or support frame 602 fixed on a base 603, with gaps or cut-outs between its members, as shown. The cradle 601 has side members 604, 605 at both ends with concavities, so that it has the shape of a shallow dish. One of the thin dough sheets 30, bent and containing a mixture 29, is conveyed and put in the desired position on the shallow dish portion of the cradle 601. On the side members 604, 605 grooves 606, 607 are provided at the position where the front face of the mixture 29 in the sheet 30 is put on the cradle 601.

Numeral 608 is a mechanism for pressing the sheet, arranged symmetrically against the center of shaft direction of the cradle 601. The mechanism 608 comprises an L-shaped pressing bar 609 attached horizontally to a cube member 610 attached to the upper end of a rotating shaft 611 so as to be able to move freely, shaft 611 being inserted vertically in brackets 612 while the latter are attached to each side of the above-mentioned support frame 602. Each end of the bars 609 is extended on the cradle 601 through the grooves 606, 607 and reciprocates in the cradle 601 in accordance with the rotation of the shaft 611.

One end of a spring 613 is attached on the other end of the bar 609, and the other end of the spring is hooked to the base 603; the center of motion of the pressing bar is the member 610. The shaft 611 passes through the base 603 and a lever 614 is fixed to the shaft. The lever 614 has two portions facing each other, as shown, and the adjoining ends of the portions are interconnected by a pin 615, and a rod 616 is connected to one of the portions. The reciprocal movement of the rod 616 operates the lever portions at the same time.

A slide plate 617 is provided above the cradle 601 and moves parallel therewith. Two guide rods 618 are provided above the plate 617, and the rods are supported by a U-shaped bracket 619 in a way that they can slide freely. The bracket 619 is secured to the upper end of lift rods 620 inserted into guide cylinders 621 fixed to the base 603. The lower ends of the rods 620 are connected by a rod 622 to each other, and a rod 623, reciprocating vertically, is connected to the rod 622.

A suitable clearance between the cradle 601 and the slide plate 617 can be obtained by the adjustment of the movement of the rod 623. The number of flexible belts 624 corresponds to that of the supporting members of the cradle 601, and one end of the belts is fixed to an end of the cradle 601 and the other ends to the plate 617, respectively, so that the belts are bent. A rod 625 is connected to the other end of the plate 617, and this plate is moved horizontally by the operation of a crank 626 through the rod 625.

An auxiliary cradle 627 is provided parallel with and under the cradle 601. The number of the bars of the auxiliary cradle corresponds to that of the gaps between the members of the cradle, and the base portion of the cradle 627 is fixed to a lift plate 628. The latter is inserted into a guide groove 629 provided vertically with the supporting frame 602 in a way that it can move freely vertically. A horizontal rod 630 is fixed to the lift plate 628 and moved vertically by a rod 631.

When the rod 631 lifts the rod 630 to its highest position, the plate 628 goes into the gaps of the cradle 601, and the heights of the upper surfaces of the plate 628 and the cradle 601 become the same. Notches or serrations 632 are provided (see FIG. 4) on the upper surface of the auxiliary cradle 627 to prevent slippage of the sheet; furthermore, needles 633 (also shown in FIG. 4) are located on suitable places on the notches for the same purpose. The other end of the horizontal rod 630 projects from the bracket or frame 602, passing through an aperture 634, to which a T-shaped rod 635 is fixed. As the rod 630 rises, the T-shaped rod 635 makes the end of the bar 609 rise, overcoming the tension of the spring 613. As the cradle 627 rises together with the rod 630, the bar 609 rotates, centering about the member 610, and the end of the bar 609 presses the sheet 30 with increased certainty.

The rod 616 which makes the pressing bar 609 open and close, the rod 623 which makes the slide plate 617 go up and down, the crank 626 which makes the slide plate 617 go left and right, and finally the rod 631 which makes the auxiliary cradle 627 rise and descend, are connected to a cam mechanism connected to the main rotating shaft, and they repeat the cyclic movements in accordance with the following procedures, although these conventional details have not been shown in the figures.

With the status as shown in FIG. 4, when the sheet 30 bent on three sides and containing the mixture 29 in it is conveyed and put on the cradle 601, the rod 616 operates first, then the pressing bar 609 comes upon the sheet 30 on the cradle 601. At the same time, the rod 631 operates and the auxiliary cradle 627 rises, the T-shaped rod 635 operates the pressing bar 609, and the latter presses the sheet on the cradle without difficulty.

Then, as shown in FIG. 5, the rod 623 operates, then the plate 617 descends to the position corresponding to the thickness of the mixture contained in the sheet, and at the same time the crank 626 operates and the plate 617 moves leftward. At this time, the mixture on the cradle 601 is shaped as a cylindrical body by the belts 624, being wrapped by the thin sheet.

The bar 609 presses the sheet until the plate 617 moves leftward and the belts 624 begin to wrap the sheet around the mixture; when the plate 617 begins to move leftward, the rod 618 separates from the cradle 601, making a retrogressive motion. When the plate 617 moves leftward, the auxiliary cradle 627 is inserted into the gaps between the cradle 601, and the sheet containing the mixture is completely finished, without slipping on the belts 624.

When the sheet wraps the mixture, the slide plate 617 moves rightward, returning to the original position shown in FIG. 4. At the same time, the cradle 627 separates from the cradle 601 and returns to the downward, original position. Then, the finished products are moved from the cradle 601, and other semi-finished products are conveyed and put onto the cradle 601, and then the pressing bar 609, the slide plate 617 and the auxiliary cradle 627 repeat the movements mentioned in connection with FIGS. 4 and 5, thus completing the products.

It should be understood, of course, that the foregoing disclosure relates only to a preferred embodiment and to preferred features of the invention, and that it is intended to cover all changes and modifications of the examples described which do not constitute departures from the spirit and scope of the invention.

What I claim is:

1. A device for wrapping dough sheets around a mixture of minced vegetables, meat and the like, to make rolled food, comprising: a stationary comb-shaped first cradle having the shape of a shallow dish and a concavity therein for receiving the dough sheets having the mixture thereon, and at least one cut-out therein; a slide plate movable substantially parallel with said first cradle; means for performing a reciprocating movement of said slide plate in two perpendicular planes, one being substantially parallel to that of said first cradle; at least one lateral pressing bar, partly above said first cradle, and movable about an arcshaped path, for holding down the sheets to the surface of said first cradle; an auxiliary cradle underneath said first cradle, movable at least partly into said cut-out, and having a serrated upper engaging surface; and at least one belt, secured with one end to said first cradle and with the other to said slide plate.

2. The device as defined in claim 1, wherein a pair of said pressing bars are provided flanking said first cradle.

3. The device as defined in claim 2, further comprising means for imparting a combined arcuate and rectilinear movement to said pair of pressing bars.

* * * * *